F. HARTMAN.
LAMP-EXTINGUISHER.

No. 170,556. Patented Nov. 30, 1875.

Witnesses
John Tunbridge
J. C. Tunbridge

Inventor
Frederich Hartman
By O Drake, Atty.

UNITED STATES PATENT OFFICE.

FREDERICK HARTMAN, OF NEWARK, NEW JERSEY.

IMPROVEMENT IN LAMP-EXTINGUISHERS.

Specification forming part of Letters Patent No. 170,556, dated November 30, 1875; application filed September 27, 1875.

*To all whom it may concern:*

Be it known that I, FREDERICK HARTMAN, of the city of Newark, in the county of Essex and State of New Jersey, have invented certain new and useful Improvements in Lamps; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to certain improvements in extinguishers for kerosene and other lamps, and is intended to combine simplicity and cheapness in its construction, and to be reliable in its operation, my object being to avoid the many accidents and other disadvantages incident to the prevailing mode of blowing a light out.

The accompanying drawing, to which reference is made, fully illustrates the nature and object of my invention, in which—

Figure 1:
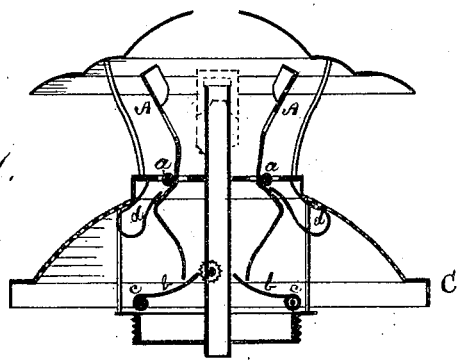
Figure 2:
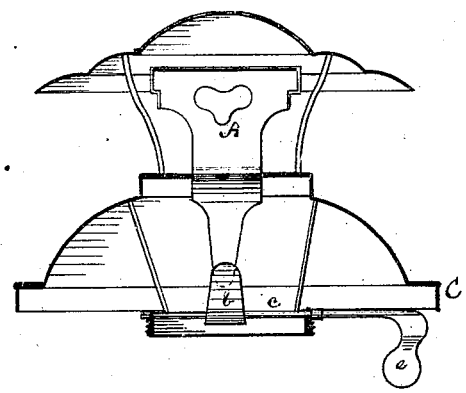

Figure 1 is a vertical cross-section of the top of an ordinary kerosene-lamp having my improvements attached thereto, and Fig. 2 is a side view of the same.

My invention consists in the construction of two irregularly-shaped arms or levers, A, from thin sheet metal, each being adjusted upon a shaft, $a$, and operated by arms $b$, which are rigidly secured upon shaft $c$ and springs $d$, all as shown and indicated in Fig. 1. Said shafts $c$ extend to the outer circumference of the portion to which they are secured, and are provided with suitable finger-tips $e$, which, being grasped by the thumb and finger and pressed inward, cause the arms $b$ to press against the lower ends of the parts A in such a manner as to bring their upper ends into juxtaposition, so as to close over the lighted end of the wick and around the upper portion of the wick-tube, thereby instantly smothering and extinguishing the flame, said upper parts or ends being formed somewhat like a pair of snuffers, all as shown and indicated in Figs. 1 and 2. Suitable springs $e$ are also arranged so as to engage with the parts A in such a manner that, the moment the pressure upon the finger-tips $e$ is removed, said springs will throw the parts A back in opposite directions, and prevent them from accidentally coming in contact with the flame, as clearly shown and indicated in Fig. 1.

By combining the secondary arms or levers $b$ with the usual arms A the latter may be closed above the wick by pressing together the tips $e$, arranged beneath the disk of the burner, thus avoiding the heating of the tips and the danger of burning the fingers resulting from the use of operating-levers extending upward adjacent to the chimney.

Having thus described my invention, what I claim as new, and desire to secure by Letters Patent of the United States, is—

The combination, with the spring-arms $a$, hung to the burner and closing over the wick, of secondary arms $b\ b$, operated by shafts $c$, provided at their outer ends with arms or tips $e$, extending downward, as and for the purpose specified.

In testimony that I claim the foregoing as my own invention I affix hereto my signature in presence of two witnesses.

FREDERICK HARTMAN.

Witnesses:
OLIVER DRAKE,
J. C. TUNBRIDGE.